US012784141B2

(12) United States Patent
Huang et al.

(10) Patent No.: US 12,784,141 B2
(45) Date of Patent: Nov. 3, 2026

(54) DEFECTIVE PIXEL CORRECTION METHOD AND APPARATUS, AND TERMINAL AND COMPUTER-READABLE STORAGE MEDIUM

(71) Applicant: WUHAN GUIDE SENSMART TECH CO., LTD., Wuhan (CN)

(72) Inventors: Cheng Huang, Wuhan (CN); Lei Fang, Wuhan (CN); Yu Zhou, Wuhan (CN); Qing Ma, Wuhan (CN)

(73) Assignee: WUHAN GUIDE SENSMART TECH CO., LTD., Wuhan (CN)

( * ) Notice: Subject to any disclaimer, the term of this patent is extended or adjusted under 35 U.S.C. 154(b) by 230 days.

(21) Appl. No.: 18/674,758

(22) Filed: May 24, 2024

(65) Prior Publication Data

US 2024/0311972 A1 Sep. 19, 2024

Related U.S. Application Data

(63) Continuation of application No. PCT/CN2022/100992, filed on Jun. 24, 2022.

(30) Foreign Application Priority Data

Nov. 25, 2021 (CN) ......................... 202111409731.8

(51) Int. Cl.
*G06T 5/50* (2006.01)
*G06T 7/00* (2017.01)

(52) U.S. Cl.
CPC .............. *G06T 5/50* (2013.01); *G06T 7/0002* (2013.01); *G06T 2207/10048* (2013.01); *G06T 2207/30168* (2013.01)

(58) Field of Classification Search
None
See application file for complete search history.

(56) References Cited

U.S. PATENT DOCUMENTS 9,501,839 B1 11/2016 Korchev et al.
2017/0160127 A1* 6/2017 Salisbury .............. G01J 1/0228

FOREIGN PATENT DOCUMENTS

CN 101895786 A 11/2010
CN 110463199 A 11/2019
(Continued)

OTHER PUBLICATIONS

L. Mijatović, H. Dean and M. Roić, "Implementation of algorithm for detection and correction of defective pixels in FPGA," 2012 Proceedings of the 35th International Convention MIPRO, Opatija, Croatia, 2012, pp. 1731-1735. (Year: 2012).*
(Continued)

*Primary Examiner* — David Ometz

(57) ABSTRACT

A defective pixel correction method, an apparatus, a terminal, and a computer-readable storage medium are disclosed. The defective pixel correction method includes judging a defective pixel in an initial image; obtaining a first possible defective pixel table; obtaining a second possible defective pixel table by two consecutive image frames generated in real-time; based on a non-repetition part of the possible defective pixels in the overlapping area in the latter image frame in the current first possible defective pixel table and the second possible defective pixel table, updating the first possible defective pixel table; repeating the above-mentioned steps to obtain a final first possible defective pixel table for defective pixel correction.

7 Claims, 4 Drawing Sheets

(56) References Cited

FOREIGN PATENT DOCUMENTS

| | | | | | |
|---|---|---|---|---|---|
| CN | 110830795 | A | | 2/2020 | |
| CN | 112637587 | A | | 4/2021 | |
| CN | 112734719 | A | | 4/2021 | |
| FR | 2939938 | A1 | * | 6/2010 | ............... G06T 5/50 |
| JP | 2010187409 | A | * | 8/2010 | |
| WO | WO-2010069878 | A1 | * | 6/2010 | ............... G06T 5/50 |

OTHER PUBLICATIONS

J. An, W. Lee and J. Kim, "Adaptive Detection and Concealment Algorithm of Defective Pixel," 2007 IEEE Workshop on Signal Processing Systems, Shanghai, China, 2007, pp. 651-656. (Year: 2007).*

* cited by examiner

DEFECTIVE PIXEL CORRECTION METHOD AND APPARATUS, AND TERMINAL AND COMPUTER-READABLE STORAGE MEDIUM

CROSS-REFERENCE TO RELATED APPLICATIONS

This application is a continuation of and claims priority to International (PCT) Patent Application No. PCT/CN2022/100992, filed on Jun. 24, 2022, entitled "DEFECTIVE PIXEL CORRECTION METHOD AND APPARATUS, AND TERMINAL AND COMPUTER-READABLE STORAGE MEDIUM", which clams priority to Chinese Patent Application No. CN 202111409731.8, filed Nov. 25, 2021, the contents of which are hereby incorporated by reference.

TECHICAL FIELD

The invention relates to the technical field of image correction, in particular to a defective pixel correction method, an apparatus, a terminal, and a computer-readable storage medium.

BACKGROUND

In the case of high-speed impact, infrared imaging device will have defective pixels, which will affect the subsequent use and need to be corrected. However, the existing defective pixel correction methods are to manually correct the defective pixels after the defective pixels appear. At present, this defective pixel correction method needs to meet the external operating conditions for correcting defective pixels of device after the defective pixels appear, which is relatively restrictive or has no operating conditions at all, and the operation takes up a lot of time.

Therefore, a better scheme is needed to solve the problems in the prior art at present.

SUMMARY OF THIS DISCLOSURE

In view of this, the invention provides a defective pixel correction method and an apparatus, and a terminal and a computer-readable storage medium, which are used for solving the problems in the prior art and realizing automatic defective pixel correction. Specifically, the embodiment of the invention provides the following specific embodiments:

The embodiment of the invention provides a defective pixel correction method, which includes the following steps:

Step A, acquire an initial image generated by an infrared imaging device if it is detected that the infrared imaging device meets a preset trigger condition;

Step B, determine whether each point in the initial image is a possible defective pixel according to a preset defective pixel determination feature;

Step C, summarize all the possible defective pixels in the initial image to obtain a first possible defective pixel table;

Step D, aiming at the two consecutive image frames generated by the infrared imaging device in real time, determine the overlapping areas of the two consecutive image frames;

Step E, determine the possible defective pixels in the overlapping area in the latter frame of the two consecutive image frames, and form a second possible defective pixel table;

Step F, determine the non-repetition part of the possible defective pixels in the overlapping area in the latter image frame in the current first possible defective pixel table and the second possible defective pixel table;

Step G, after the non-repetition part is eliminated from the first possible defective pixel table, obtain an updated first possible defective pixel table;

Step H, repeatedly execute step D-step G to obtain a final first possible defective pixel table;

Step I, perform defective pixel correction on the basis of the final first possible defective pixel table.

In a specific embodiment, the method further includes:

Acquire the motion characteristics of the infrared imaging device in real time;

When determine that the motion amplitude of the infrared imaging device is greater than a preset amplitude threshold on the basis of the motion characteristics, so confirm that the infrared imaging device meets a preset trigger condition.

In a specific embodiment, acquire the motion characteristics of the infrared imaging device in real time includes:

The infrared imaging device is monitored in real time by a motion situation sensor to obtain the motion characteristics of the infrared imaging device in real time.

In a specific embodiment, the defective pixel determination feature is generated on basis of the difference between the defective pixel and the normal pixel.

In a specific embodiment, the number of repetitions of step D-step G executed is related to the accuracy requirement; wherein, the higher the accuracy requirement, the more corresponding times.

In a specific embodiment, the step D includes:

Respectively calculate the projection in the X direction and the projection in the Y direction of the two consecutive image frames generated by the infrared imaging device in real time in a preset rectangular coordinate system;

Determine the translation amount of the two consecutive image frames in the X direction and the Y direction based on the projection of the two consecutive image frames in the X direction and the Y direction;

Based on the translation amount of the two consecutive image frames in the X direction and the translation amount in the Y direction, determine the overlapping area of the two consecutive image frames.

In a specific embodiment, the step E includes:

Determine whether each point in the overlapping area in the latter frame of the two consecutive image frames is a possible defective pixel based on the preset defective pixel determination feature;

Summarize all the possible defective pixels in the overlapping area to obtain a second possible defective pixel table.

The embodiment of the invention also provides a defective pixel correction device, which is characterized by comprising:

An acquisition module, configured to acquire an initial image generated by an infrared imaging device if detect that the infrared imaging device meets a preset trigger condition;

A preliminary determination module, configured to determinate whether each point in the initial image is a possible defective pixel according to a preset defective pixel determination feature;

A first table module, configured to summarize all the possible defective pixels in the initial image to obtain a first possible defective pixel table;

An overlapping module, configured to determine an overlapping area of two consecutive image frames generated by the infrared imaging device in real time;

A second table module, configured to determine the possible defective pixels located in the overlapping area in the latter image of the two consecutive image frames and form a second possible defective pixel table;

A determining module, configured to determine the non-repetition part of the possible defective pixels in the overlapping area in the latter frame of two consecutive image frames in the current first possible defective pixel table and the second possible defective pixel table;

An updating module, configured to obtain an updated first possible defective pixel table after eliminating the non-repetition part from the first possible defective pixel table;

An iteration module, configured to repeatedly execute the overlapping module-updating module to obtain a final first possible defective pixel table;

The correction module performs defective pixel correction on the basis of the final first possible defective pixel table.

The embodiment of the invention also provides a terminal, which comprises a memory and a processor, wherein the memory is used for storing a computer application program, and the processor runs the computer application program to enable the terminal to execute the defective pixel correction method.

The embodiment of the invention also provides a computer-readable storage medium, wherein a computer application program is stored on the computer-readable storage medium, and when the computer application program is executed by a processor, the defective pixel correction method is realized.

Therefore, the embodiment of the invention provides a defective pixel correction method and an apparatus, and a terminal and a computer-readable storage medium. The method comprises the following steps: step A, acquire an initial image generated by an infrared imaging device if it is detected that the infrared imaging device meets a preset trigger condition; step B, determine whether each point in the initial image is a possible defective pixel according to a preset defective pixel determination feature; step C, summarize all the possible defective pixels in the initial image to obtain a first possible defective pixel table; step D, aiming at the two consecutive image frames generated by the infrared imaging device in real time, determine the overlapping areas of the two consecutive image frames; step E, determine the possible defective pixels in the overlapping area in the latter frame of the two consecutive image frames, and form a second possible defective pixel table; step F, determine the non-repetition part of the possible defective pixels in the overlapping area in the latter image frame in the current first possible defective pixel table and the second possible defective pixel table; step G, after the non-repetition part is eliminated from the first possible defective pixel table, obtain an updated first possible defective pixel table; step H, repeatedly execute step D-step G to obtain a final first possible defective pixel table; step I, performing defective pixel correction on the basis of the final first possible defective pixel table. In this scheme, based on the performance difference between the defective pixel and the normal pixel in the image generated by infrared imaging device, the location of the defective pixel is located by image recognition and processing, and then the defective pixel is corrected to ensure the quality of the image. Because the image processing method is used to correct, this scheme can automatically correct the newly generated defective pixel without manual operation, with high real-time performance and time saving. And is not limited by the operating conditions for correcting the defective pixels of the imaging device, and has high universality.

BRIEF DESCRIPTION OF THE DRAWINGS

In order to explain the technical scheme of the present invention more clearly, the drawings needed in the embodiments will be briefly introduced below. It should be understood that the following drawings only show some embodiments of the present invention, so they should not be regarded as limiting the protection scope of the present invention. In the drawings, like components are given like numerals.

DETAILED DESCRIPTION OF THE DISCLOSURE

Figure 1:
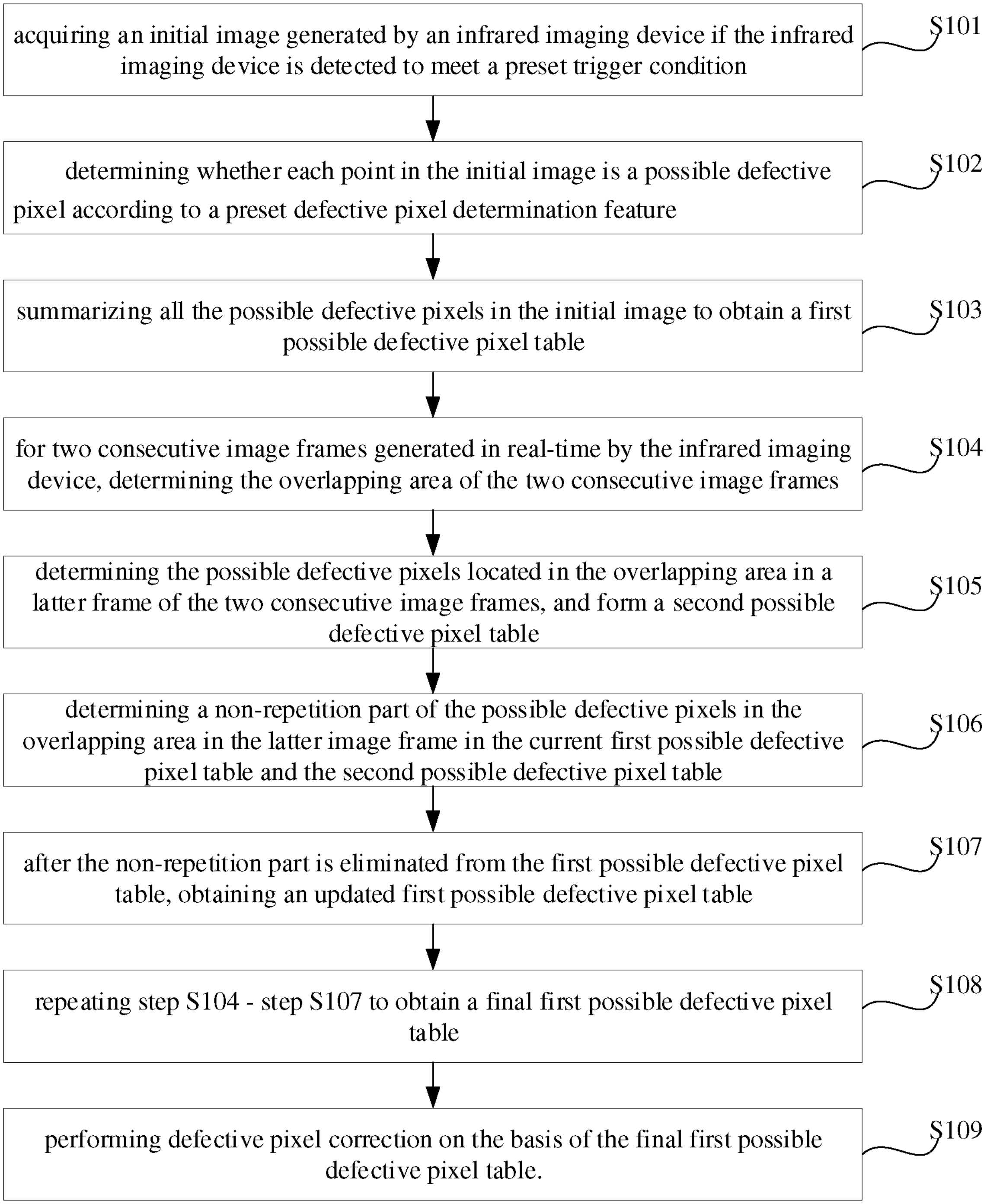
FIG. 1 shows a flowchart of a defective pixel correction method proposed by an embodiment of the present invention.

In the following, the technical scheme in the embodiment of the invention will be described clearly and completely with the attached drawings. Obviously, the described embodiment is only a part of the embodiment of the invention, but not the whole embodiment.

The components of the embodiments of the present invention generally described and illustrated in the drawings herein can be arranged and designed in various different configurations. Therefore, the following detailed description of the embodiments of the invention provided in the drawings is not intended to limit the scope of the claimed invention, but merely represents selected embodiments of the invention. On the basis of the embodiments of the present invention, all other embodiments obtained by those skilled in the art without creative work belong to the scope of protection of the present invention.

Hereinafter, the terms “including”, “having” and their cognates that can be used in various embodiments of the present invention are only intended to represent specific features, numbers, steps, operations, elements, components or combinations of the foregoing items, and should not be understood as first excluding the existence of one or more other features, numbers, steps, operations, elements, components or combinations of the foregoing items or adding one or more features, numbers.

In addition, the terms "first", "second" and "third" are only used to distinguish descriptions and cannot be interpreted as indicating or implying relative importance.

Unless otherwise defined, all terms (including technical terms and scientific terms) used herein have the same meaning as commonly understood by ordinary people in the field to which various embodiments of the present invention belong. The terms, such as those defined in commonly used dictionaries, will be interpreted as having the same meaning as the contextual meaning in the related technical field and will not be interpreted as having an idealized meaning or an overly formal meaning unless explicitly defined in various embodiments of the present invention.

Embodiment 1

Embodiment 1 of the present invention discloses a defective pixel correction method, as shown in FIG. 1, including the following steps:

Step S101: If it is detected that the infrared imaging device meets the preset trigger condition, acquire an initial image that is generated by the infrared imaging device;

Specifically, in one embodiment, acquire the motion characteristics of the infrared imaging device in real time;

When it is determined that the motion amplitude of the infrared imaging device is greater than a preset amplitude threshold on the basis of the motion characteristics, it is confirmed that the infrared imaging device meets a preset trigger condition.

Figure 2:
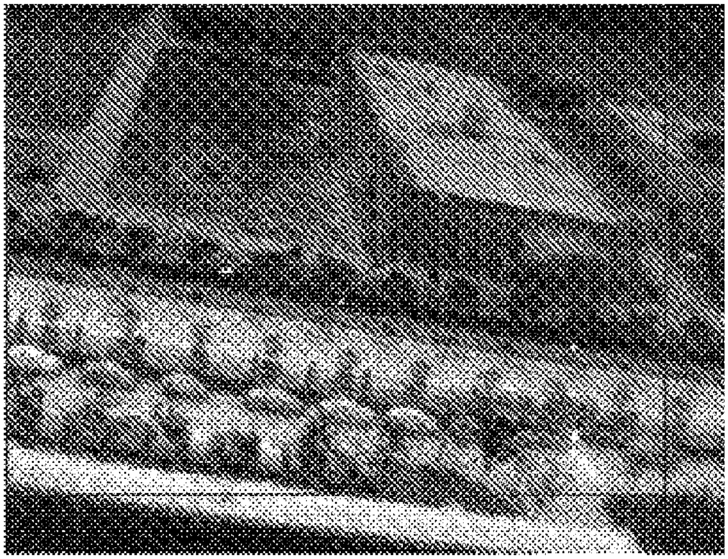
FIG. 2 shows a schematic diagram of an initial image in an embodiment of the present invention.

In the actual scene, the motion of the infrared imaging device will be monitored in real time. When the monitored motion amplitude reaches a certain value, this scheme will be started, that is, a defective pixel correction method will be started, so that acquire the infrared image currently generated by the infrared imaging device, that is, the initial image. The specific initial image is shown in FIG. 2.

Further, acquire the motion characteristics of the infrared imaging device in real time includes:

The infrared imaging device is monitored in real time by a motion situation sensor to acquire the motion characteristics of the infrared imaging device in real time.

Specifically, the infrared imaging device is monitored by the motion situation sensor, and a sensor with appropriate accuracy can be selected according to the specific situation for monitoring, and the specific monitoring is real-time.

Specifically, the monitoring can be triggered according to the working time of the infrared imaging device, and when the infrared imaging device starts imaging, the sensor can be started to monitor the infrared imaging device at the same time.

Step S102, according to a preset defective pixel determination feature, determine whether each pixel in the initial image is a possible defective pixel;

After acquire the initial image, determine whether each pixel in the initial image is a possible defective pixel on the basis of the preset defective pixel determination characteristics, and the specific point is a pixel point in the image. By determining each pixel point, it can be determined which points are possible defective pixels.

Specifically, the defective pixel determination feature is generated based on the difference between the defective pixel and the normal pixel. When in a motion state, the performance difference between a defective pixel and a normal pixel in an infrared image generated by an infrared imaging device during the motion process on the basis of this difference, a defective pixel determination feature can be generated in advance, or a defective pixel determination threshold can be obtained by comparing the difference between a defective pixel and a normal pixel. Subsequently, a pixel to be determined at present can be determined to confirm whether it is a possible defective pixel.

Step S103, summarize all the possible defective pixels in the initial image so as to obtain a first possible defective pixel table;

Specifically, here is a specific example to illustrate. For example, if there are multiple pixel points in the initial image, pixel 1, pixel 2 and pixel 3 as possible defective pixels, so summarize these pixel points to obtain the first possible defective pixel table.

In addition, in order to locate the possible defective pixels and facilitate the subsequent search, it can be identified on the basis of the location of the possible defective pixels, for example, it can be identified by the location of the possible defective pixels in the image, including the horizontal and vertical coordinates; in addition, you can also choose other ways to mark possible defective pixels.

Subsequently, summarize the position and preset name of each possible defective pixels in the first possible defective pixel.

In the table, the possible defective pixel 1 in the first possible defective pixel table is taken as an example to explain. For example, the possible defective pixel 1 may also be associated with the first horizontal and vertical coordinates or other information that can identify the possible defective pixel 1.

StepS104, for two consecutive image frames that are generated by the infrared imaging device in real time, determining the overlapping areas of the two consecutive image frames;

Specifically, the step S104 includes:

For two consecutive image frames that are generated by the infrared imaging device in real time, respectively calculating the projection in the X direction and the projection in the Y direction of the two consecutive image frames in a preset rectangular coordinate system; determine the translation amount of the two consecutive image frames in the X direction and the Y direction on the basis of the projection of the two consecutive image frames in the X direction and the Y direction; determine the overlapping areas of the two consecutive image frames on the basis of the translation of the two images in the X direction and the translation in the Y direction.

Because the infrared imaging device will continuously generate new infrared images, in addition to the initial image (which was also generated by the infrared imaging device at that time in real time), new images will be continuously generated, and there will be new image frames according to the generation time; therefore, the previous image in the two consecutive image frames with the earliest generation time is the initial image in the previous step. Of course, with the continuous generation of new infrared images by infrared imaging device, the previous image in the two consecutive image frames will be constantly changed. For example, according to the generation time, the generated images are image 1, image 2, image 3 and image 4 in turn; image 1 is the initial image, and the two consecutive image frames with the earliest generation time are Image 1 and Image 2. Of course, with the continuous change of time, two consecutive image frames can become images 2 and 3, images 3 and 4, and so on.

For two consecutive image frames, processing will be carried out, specifically, the two consecutive image frames will be projected in the X direction and in the Y direction in the preset rectangular coordinate system. On the basis of the projection of two consecutive image frames in two vertical directions, determine the translation amount of two consecutive image frames in two directions. After determining the translation amounts of the two consecutive image frames in two vertical directions, determine the two consecutive image frames on the basis of the translation amounts.

The overlapping area of the latter two images. The specific overlapping areas are shown in the box in FIGS. 2 and 3.

Step S105: Determine the possible defective pixels, which are located in the overlapping area, of the latter frame in the two consecutive image frames, and form a second possible defective pixel table.

Step S105 specifically includes the following steps: determine whether each point in the overlapping area in the latter frame of the two consecutive image frames is a possible defective pixel by possible defective pixel determination features;

Summarize all the possible defective pixels in the overlapping area to obtain a second possible defective pixel table.

In this step, it is determined whether each point included in the part located in the overlapping area in the next frame of image is a possible defective pixel, and the specific determination can be that the difference value between each pixel point and the pixel point previously confirmed as normal is compared with the defective pixel determination threshold, and if the difference value is greater than the defective pixel determination threshold, the point can be considered as a possible defective pixel; on the other hand, if the difference value is not greater than the defective pixel determination threshold, the point is not considered as a possible defective pixel. After determine the possible defective pixels located in the overlapping area in the latter image frame, summarize the possible defective pixels to obtain a second possible defective pixel table;

The specific forms of the second possible defective pixel table and the first possible defective pixel table can be the same, but the possible defective pixels may be different. In the second possible defective pixel table, the names of the possible defective pixels and the location information of the second possible defective pixel can also be stored.

Step S106: Determine the non-repetition part of the possible defective pixels of the current first possible defective pixel table and the second possible defective pixel table in the overlapping area in the latter image frame;

Specifically, there are a plurality of possible defective pixels in the first possible defective pixel table, and there are also plurality of possible defective pixel tables in the second possible defective pixel table; Each possible defective pixel has location information, so that a plurality of possible defective pixels in the first possible defective pixel table include, for example, point 1, point 2, point 3 and point 4, while a plurality of possible defective pixels in the second possible defective pixel table include, for example, point 1, point 2, point 3 and point 4, determine the repetition parts (i.e., repetition possible defective pixels, i.e., point 1, point 2 and point 3), and then determine other parts outside the repetition parts, which are the non-overlapping parts (i.e., the non-repetition possible defective pixels, i.e., point 4).

Figure 3:
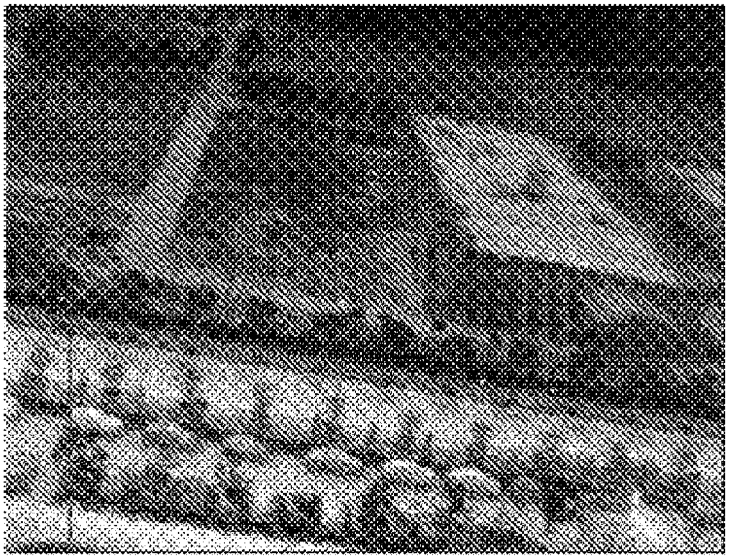
FIG. 3 shows a schematic diagram of the next image among two consecutive image frames in the embodiment of the present invention.

For the box part in FIG. 3, in the overlapping area in FIG. 3.

Step S107: Eliminate the non-repetition part from the first possible defective pixel table, and then obtain an updated first possible defective pixel table;

After eliminating the non-repetition areas to obtain in the above steps from the areas corresponding to each possible defective pixel in the first possible defective pixel table, a plurality of possible defective pixels included in the obtained remaining areas form an updated first possible defective pixel table.

Step S108: Repeatedly execute step S104 to step S107, so as to obtain the final first possible defective pixel table;

In this scheme, by continuously photographing new scenes, but for infrared imaging device, if there is a defective pixel, the relative position of the defective pixel in the image is unchanged, and because of different scenes, it may lead to overexposure or darkness in the scene, leading to or masking the defective pixel or mistaking the normal pixel as a defective pixel, so it is necessary to take images of different scenes for comprehensive determination. That is to say, it is necessary to constantly carry out the operation of identification and correction on the basis of the new two consecutive image frame, that is, to repeatedly execute steps S104 to S107, and through many iterations, obtain the final first possible defective pixel table.

In a specific embodiment, repeatedly execute steps S104-S107, and the first possible defective pixel table is continuously updated through the continuous iterative process, and obtain the final first possible defective pixel table when the iteration reaches a certain level.

In a specific embodiment, the number of repetitions of step S104-step S107 executed is related to the accuracy requirement; wherein, the higher the accuracy requirement, the more corresponding times. Specifically, the number of repetitions or iterations can be achieved according to the actual situation, the performance of defective pixels and the required accuracy. Generally speaking, the longer the number of repetitions or iterations takes, the more accurate it will eventually be. In specific practical situations, the number of repetitions or iterations can be selected by comprehensively balancing time and accuracy.

Step S109: Perform defective pixel correction on the basis of the final first possible defective pixel table.

Through the above steps, obtain the final first possible defective pixel table, and what are recorded in the final first possible defective pixel table are the final confirmed defective pixels. In this case, the defective pixels can be replaced one by one, and replace the normal pixel points, so that obtain the image with corrected defective pixels.

Embodiment 2

Embodiment 2 of the present invention also discloses a defective pixel correction method in a specific application scenario, which includes the following specific steps:

Step 1, acquire the motion characteristics of infrared imaging device in real time through a motion situation sensor;

Step 2, when the motion situation sensor detects that the infrared imaging device has a large global motion, execute the automatic defective pixel correction algorithm initially;

Step 3, in the algorithm of automatically correcting defective pixels, firstly, according to the preset defective pixel determination threshold, determine whether each point in the initial image is a possible defective pixel, and obtain a possible defective pixel table L0; The specific determination can be that the difference value between each pixel point in the initial image and the pixel point previously confirmed as normal is compared with the defective pixel determination threshold, and if the difference value is greater than the defective pixel determination threshold, the point can be considered as a possible defective pixel; On the other hand, if the difference value is not greater than the determination threshold of the defective pixel, the point is not considered as a possible defective pixel.

Step 4, acquire two consecutive image frames before and after the real-time image, and respectively calculating the projections of the two consecutive image frames in the X and Y directions;

Step 5, obtain that translation amounts of the two consecutive image frames in the X and Y directions according to the projection of the two consecutive image frames in the X and Y direction;

Step 6, according to the translation amounts of the two consecutive image frames in the X and Y directions, obtain the overlapping areas of the two consecutive image frames;

Step 7, determine whether each point in the overlapping area of the latter image frame is a possible defective pixel according to the defective pixel determination threshold, and obtain a possible defective pixel table L1;

Step 8, compare the overlapping areas of the images covered by L0 and L1 to obtain the non-repetition part Lx of the possible defective pixel in the overlapping area of the latter image frame;

Step 9, replace the original L0 with the value obtained by subtracting Lx from L0, and continue the subsequent algorithm;

Step 10: Repeat steps 4-9 for n times to get the final defective pixel table L0, where the value of n is not a fixed value. According to the defective pixel performance of the device and the actual application environment setting, the value of n is large, and the algorithm takes a long time, but the final defective pixel table is more accurate;

Step 11: According to the final defective pixel table L0, each point in the real-time image is replaced by defective pixels in turn, and obtain the image after defective pixel correction.

On the basis of motion image detection, this scheme uses the performance difference between the defective pixels in the infrared image and the normal pixels in the motion process to locate the defective pixels, and then automatically corrects the defective pixels according to the image characteristics to ensure the image quality. On the basis of motion image detection, compare the difference of defective pixels in the overlapping area of two consecutive image frames. And can cyclically detect the difference of defective pixels in the overlapping area of two consecutive image frames in the real-time image, and continuously update the defective pixels table after subtracting the difference. This scheme can automatically complete the correction of new production defects without manual operation, with high real-time performance and time saving; moreover, this scheme is not limited by the operating conditions of defective pixel correction on the device, and has high universality.

Embodiment 3

Figure 4:
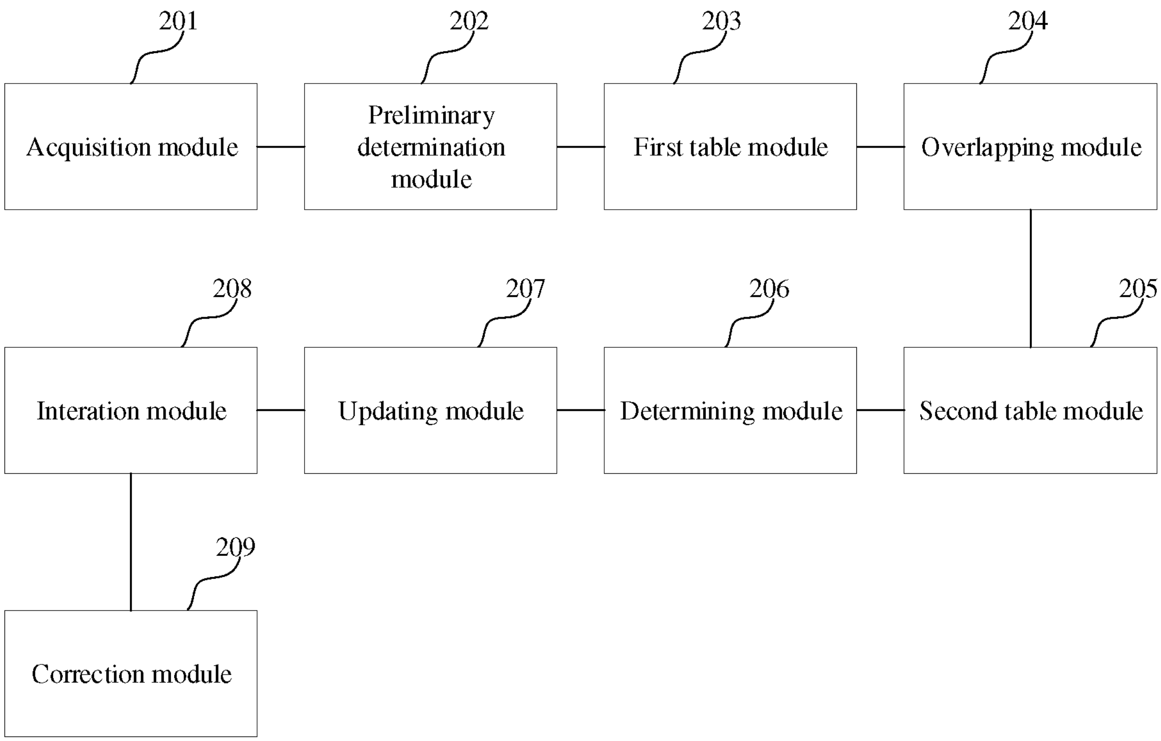
FIG. 4 shows a schematic structural diagram of a device for correcting defective pixels proposed by an embodiment of the present invention.

In order to further illustrate the present invention, Embodiment 3 of the present invention also discloses a defective pixel correction device, as shown in FIG. 4, including:

An acquisition module 201, configured to acquire an initial image generated by an infrared imaging device if detect that the infrared imaging device meets a preset trigger condition;

A preliminary determination module 202, configured to determinate whether each point in the initial image is a possible defective pixel according to a preset defective pixel determination feature;

A first table module 203, configured to summarize all the possible defective pixels in the initial image to obtain a first possible defective pixel table;

An overlapping module 204, configured to determine an overlapping area of two consecutive image frames generated by the infrared imaging device in real time;

A second table module 205, configured to determine the possible defective pixels located in the overlapping area in the latter image of the two consecutive image frames and form a second possible defective pixel table;

A determining module 206, configured to determine the non-repetition part of the possible defective pixels in the overlapping area in the latter frame of two consecutive image frames in the current first possible defective pixel table and the second possible defective pixel table;

An updating module 207, configured to obtain an updated first possible defective pixel table after eliminating the non-repetition part from the first possible defective pixel table;

An iteration module 208, configured to repeatedly execute the overlapping module-updating module to obtain a final first possible defective pixel table;

The correction module 209 performs defective pixel correction on the basis of the final first possible defective pixel table.

Figure 5:
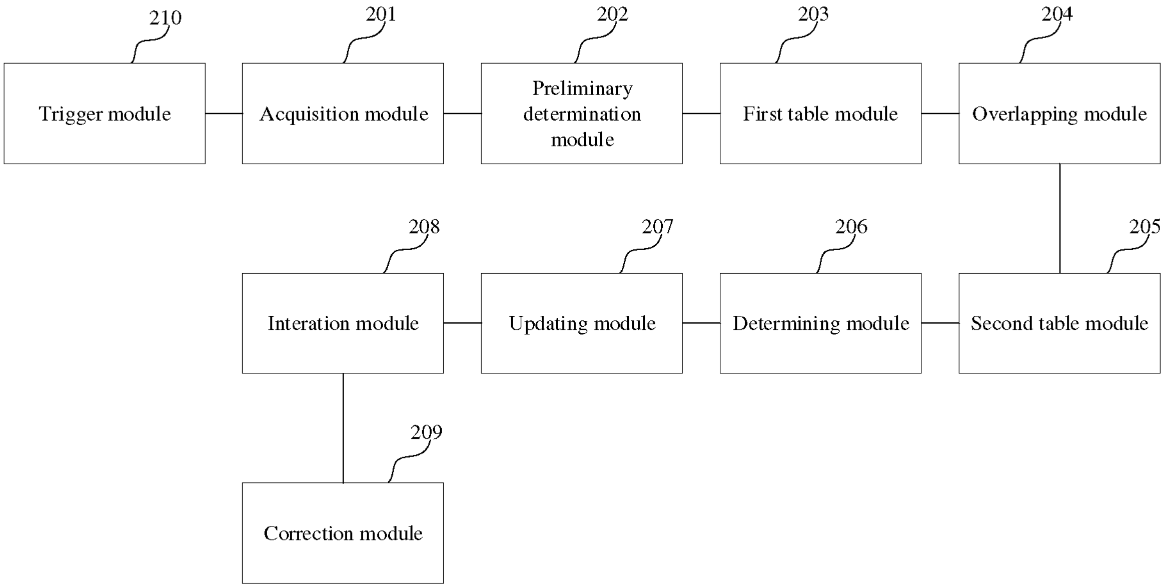
FIG. 5 shows another structural schematic diagram of a device for correcting defective pixels proposed by an embodiment of the present invention.

Further, as shown in FIG. 5, the device further includes:

A trigger module 210, configured to acquire the motion characteristics of the infrared imaging device in real time; when determine that the motion amplitude of the infrared imaging device is greater than a preset amplitude threshold on the basis of the motion characteristics, so confirm that the infrared imaging device meets a preset trigger condition.

In a specific embodiment, the trigger module 210 acquires the motion characteristics of the infrared imaging device in real time, including monitoring the infrared imaging device in real time through a motion situation sensor to acquire the motion characteristics of the infrared imaging device in real time.

In a specific embodiment, the defective pixel determination feature is generated on the basis of the difference between the defective pixel and the normal pixel.

In a specific embodiment, the number of repetitions of the projection module 204—update module 207 executed is related to the accuracy requirement; wherein, the higher the accuracy requirement, the more corresponding times.

In a specific embodiment, the overlapping module 204 is configured to: calculate the projection in the X direction and the projection in the Y direction of the two consecutive image frames generated by the infrared imaging device in real time; Determine the translation amount of the two consecutive image frames in the X direction and the translation amount in the Y direction on the basis of the projection of the two consecutive image frames in the X direction and the Y direction; determine the overlapping area of the front and back images on the basis of the translation amount of the two consecutive image frames in the X direction and the translation amount in the Y direction.

Further, the second table module 205 is used for determining whether each point in the overlapping area in the latter frame of the two consecutive image frames is a s possible defective pixel on the basis of the preset defective pixel determination feature; summarize all the possible defective pixels in the overlapping area to obtain a second possible defective pixel table.

Embodiment 4

Figure 6:
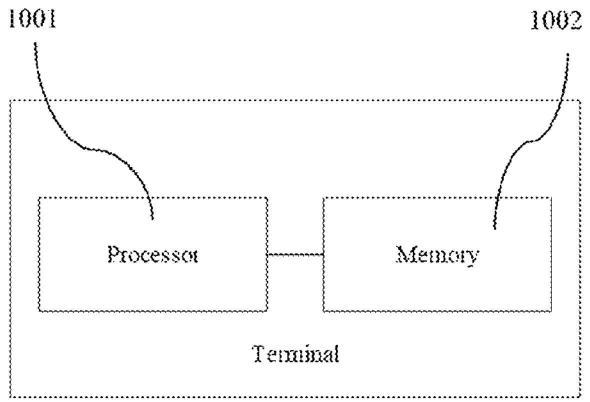
FIG. 6 shows a schematic structural diagram of a terminal proposed by an embodiment of the present invention.

Embodiment 4 of the present invention also discloses a terminal, including a memory and a processor, wherein the memory is used for storing computer applications. The terminal in Embodiment 4 of the present invention can be an infrared related product, such as an infrared imaging device. As shown in FIG. 6, the terminal can include a processor 1001 and a memory 1002, and the memory can be a high-speed RAM memory or a stable memory, such as a disk memory.

As shown in FIG. 6, the memory 1002, which is a computer-readable storage medium, may include a computer application program for correcting defective pixels. Therefore, when the processor runs the computer application program, the terminal is made to execute the following steps:

Step A, acquire an initial image generated by an infrared imaging device if it is detected that the infrared imaging device meets a preset trigger condition;

Step B, determine whether each point in the initial image is a possible defective pixel according to a preset defective pixel determination feature;

Step C, summarize all the possible defective pixels in the initial image to obtain a first possible defective pixel table;

Step D, aiming at the two consecutive image frames generated by the infrared imaging device in real time, determine the overlapping areas of the two consecutive image frames;

Step E, determine the possible defective pixels in the overlapping area in the latter frame of the two consecutive image frames, and form a second possible defective pixel table;

Step F, determine the non-repetition part of the possible defective pixels in the overlapping area in the latter image frame in the current first possible defective pixel table and the second possible defective pixel table;

Step G, after the non-repetition part is eliminated from the first possible defective pixel table, obtain an updated first possible defective pixel table;

Step H, repeatedly execute step D-step G to obtain a final first possible defective pixel table;

Step I, performing defective pixel correction on the basis of the final first possible defective pixel table.

In a specific embodiment, it further includes:

Acquire the motion characteristics of the infrared imaging device in real time;

When determine that the motion amplitude of the infrared imaging device is greater than a preset amplitude threshold on the basis of the motion characteristics, so confirm that the infrared imaging device meets a preset trigger condition.

In a specific embodiment, acquire the motion characteristics of the infrared imaging device in real time includes:

The infrared imaging device is monitored in real time by a motion situation sensor to obtain the motion characteristics of the infrared imaging device in real time.

In a specific embodiment, the defective pixel determination feature is generated on basis of the difference between the defective pixel and the normal pixel.

In a specific embodiment, the number of repetitions of step D-step G executed is related to the accuracy requirement; wherein, the higher the accuracy requirement, the more corresponding times.

In a specific embodiment, the step D includes:

Respectively calculate the projection in the X direction and the projection in the Y direction of the two consecutive image frames generated by the infrared imaging device in real time in a preset rectangular coordinate system;

Determine the translation amount of the two consecutive image frames in the X direction and the Y direction based on the projection of the two consecutive image frames in the X direction and the Y direction;

Based on the translation amount of the two consecutive image frames in the X direction and the translation amount in the Y direction, determine the overlapping area of the two consecutive image frames.

In a specific embodiment, the step E includes:

Determine whether each point in the overlapping area in the latter frame of the two consecutive image frames is a possible defective pixel based on the preset defective pixel determination feature;

Summarize all the possible defective pixels in the overlapping area to obtain a second possible defective pixel table.

Embodiment 5

Figure 7:
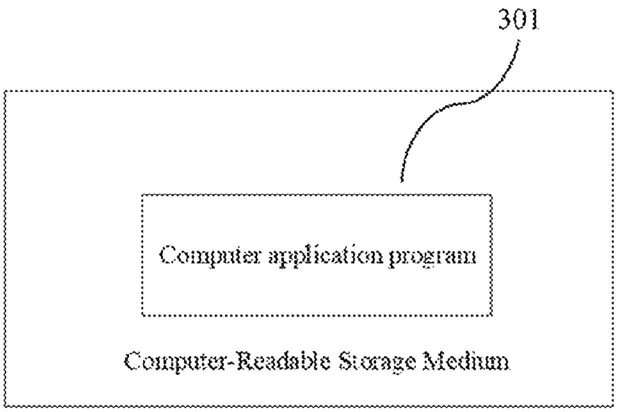
FIG. 7 shows a schematic structural diagram of a computer storage medium proposed by an embodiment of the present invention.

Embodiment 5 of the present invention also discloses a computer-readable storage medium. As shown in FIG. 7, a computer application program 301 is stored on the computer-readable storage medium, and when the computer application program 301 is executed by a processor, the defective pixel correction method described in Embodiment 1 is realized.

Specifically, the computer-readable storage medium in Embodiment 5 of the present invention can be a U disk, a mechanical hard disk, a solid-state hard disk, a Read-Only Memory (ROM), a Random Access Memory (RAM), a magnetic disk, an optical disk and other storage media that can be read and written by a computer.

Therefore, the embodiment of the invention provides a method, a device, a terminal and a computer-readable storage medium for correcting defective pixels. The method comprises the following steps: step A, acquire an initial image generated by an infrared imaging device if it is detected that the infrared imaging device meets a preset trigger condition; step B, determine whether each point in the initial image is a possible defective pixel according to a preset defective pixel determination feature; step C, summarize all the possible defective pixels in the initial image to obtain a first possible defective pixel table; step D, aiming at the two consecutive image frames generated by the infrared imaging device in real time, determine the overlapping areas of the two consecutive image frames; step E, determine the possible defective pixels in the overlapping area in the latter frame of the two consecutive image frames, and form a second possible defective pixel table; step F, determine the non-repetition part of the possible defective pixels in the overlapping area in the latter image frame in the current first possible defective pixel table and the second possible defective pixel table; step G, after the non-repetition part is eliminated from the first possible defective pixel table, obtain an updated first possible defective pixel table; step H, repeatedly execute step D-step G to obtain a final first possible defective pixel table; step I, performing defective pixel correction on the basis of the final first possible defective pixel table. In this scheme, based on the performance difference between the defective pixel and the normal pixel in the image generated by infrared imaging device, the location of the defective pixel is located by image recognition and processing, and then the defective pixel is corrected to ensure the quality of the image. Because the image processing method is used to correct, this scheme can automatically correct the newly generated defective pixel without manual operation, with high real-time performance and time saving. And is not limited by the operating conditions for correcting the defective pixels of the imaging device, and has high universality.

In several embodiments provided by this application, it should be understood that the disclosed devices and methods can also be realized in other ways. The device embodiments described above are only schematic. For example, the flowcharts and structural diagrams in the drawings show the architecture, functions and operations of possible implementations of devices, methods and computer program products according to various embodiments of the present invention. In this regard, each box in the flowchart or block diagram may represent a module, a program segment or a part of code, which contains one or more executable instructions for implementing specified logical functions. It should also be noted that in alternative implementations, the functions noted in the blocks may also occur in a different order than those noted in the drawings. For example, two consecutive blocks may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be realized by a dedicated hardware-based system that performs specified functions or actions, or can be realized by a combination of dedicated hardware and computer instructions.

In addition, each functional module or unit in each embodiment of the invention can be integrated to form an independent part, or each module can exist alone, or two or more modules can be integrated to form an independent part.

If the functions are realized in the form of software functional modules and sold or used as independent products, they can be stored in a computer-readable storage medium. Based on this understanding, the technical scheme of the present invention can be embodied in the form of a software product, which is stored in a storage medium and includes several instructions to make a computer device (which can be a smart phone, a personal computer, a server, or a network device, etc.) execute all or part of the steps of the method described in various embodiments of the present invention. The aforementioned storage media include: U disk, mobile hard disk, Read-Only Memory (ROM), Random Access Memory (RAM), magnetic disk or optical disk and other media that can store program codes.

The above is only the specific embodiment of the present invention, but the scope of protection of the present invention is not limited to this. Any person familiar with the technical field can easily think of changes or substitutions within the technical scope disclosed by the present invention, which should be included in the scope of protection of the present invention.

What is claimed is:

1. A defective pixel correction method, characterized by comprising:

step A, acquiring an initial image generated by an infrared imaging device if the infrared imaging device is detected to meet a preset trigger condition;

step B, determining whether each point in the initial image is a possible defective pixel according to a preset defective pixel determination feature;

step C, summarizing all the possible defective pixels in the initial image to obtain a first possible defective pixel table;

step D, for two consecutive frames of images generated in real-time by the infrared imaging device, separately calculating a projection in the X direction and a projection in the Y direction of the two consecutive frames in a preset rectangular coordinate system;

determining a translation amount of the two consecutive image frames in the X direction and the Y direction based on the projection of the two consecutive image frames in the X direction and the Y direction;

based on the translation amount of the two consecutive image frames in the X direction and the translation amount in the Y direction, determining an overlapping area of the two consecutive image frames;

step E, determining possible defective pixels located in the overlapping area in a latter frame of the two consecutive image frames, and forming a second possible defective pixel table;

step F, determining a non-repetition part of the possible defective pixels in the overlapping area in the latter image frame in the current first possible defective pixel table and the second possible defective pixel table;

step G, after the non-repetition part is eliminated from the first possible defective pixel table, obtaining an updated first possible defective pixel table;

step H, repeating step D-step G to obtain a final first possible defective pixel table; and step I, performing defective pixel correction on the basis of the final first possible defective pixel table.

2. The method according to claim 1, characterized by further comprising:

acquiring a motion characteristic of the infrared imaging device in real-time; and confirming that the infrared imaging device meets a preset trigger condition when the motion amplitude of the infrared imaging device is determined to be greater than a preset amplitude threshold on the basis of the motion characteristics.

3. The method according to claim 2, characterized in that acquiring the motion characteristics of the infrared imaging device in real-time comprises:

real-time monitoring of the infrared imaging device using a motion situation sensor to obtain the motion characteristics of the infrared imaging device.

4. The method according to claim 1, characterized in that the defective pixel determination feature is generated on basis of the difference between the defective pixel and a normal pixel.

5. The method according to claim 1, characterized in that the number of repetitions of step D-step G is related to the accuracy requirement; wherein the higher the accuracy requirement, the more corresponding times.

6. The method according to claim 1, characterized in that the step E comprises:

determining whether each point in the overlapping area in the latter frame of the two consecutive image frames is a possible defective pixel based on the preset defective pixel determination feature; and summarizing all the possible defective pixels in the overlapping area to obtain the second possible defective pixel table.

7. A non-transitory computer-readable storage medium, characterized in that a computer application program is stored on the computer-readable storage medium, and the computer application program, when executed by a processor, realizes the defective pixel correction method of claim 1.

* * * * *